United States Patent [19]

Breitbach

[11] Patent Number: 4,583,752
[45] Date of Patent: Apr. 22, 1986

[54] SPRING-SYSTEM FOR MOTOR VEHICLES

[75] Inventor: Elmar Breitbach, Göttingen, Fed. Rep. of Germany

[73] Assignee: Deutsche Forschungs -und Versuchsanstalt für Luft -und Raumfahrt e.V., Fed. Rep. of Germany

[21] Appl. No.: 594,782

[22] Filed: Mar. 29, 1984

[30] Foreign Application Priority Data

Apr. 11, 1983 [DE] Fed. Rep. of Germany ....... 3312895
Mar. 22, 1984 [DE] Fed. Rep. of Germany ....... 3410473

[51] Int. Cl.$^4$ .............................................. B60S 9/00
[52] U.S. Cl. ..................................... 280/6 R; 308/10; 335/306
[58] Field of Search .......................... 308/10; 188/267; 280/6 R, DIG. 1; 335/306

[56] References Cited

U.S. PATENT DOCUMENTS

| 3,958,842 | 5/1976 | Telle | 308/10 |
| 4,105,216 | 8/1978 | Graham | 280/6 R |

FOREIGN PATENT DOCUMENTS

| 1291575 | 3/1969 | Fed. Rep. of Germany | 308/10 |
| 0028186 | 4/1964 | German Democratic Rep. | 308/10 |
| 0065418 | 4/1982 | Japan | 308/10 |
| 0642353 | 8/1950 | United Kingdom | 308/10 |

Primary Examiner—R. Skudy
Attorney, Agent, or Firm—Thomas & Kennedy

[57] ABSTRACT

A spring-system, used for the suspension of motor-vehicles, comprises a mechanical, pneumatic, or hydro-pneumatic suspension-spring inserted between the sprung and the unsprung masses of the motor-vehicle. The suspension-spring is linear and possesses relatively high positive rigidity with only short spring-travel. Arranged in parallel with the suspension-spring is a correcting spring having negative rigidity and zero-crossover in the region of negative rigidity. The correcting spring comprises two parts each equipped with permanent magnets, one of these parts being connected to the sprung mass and the other to the unsprung mass. Each of the parts of the correcting spring comprises a plurality of permanent magnets arranged one behind the other in the direction of movement, with pieces of soft iron arranged therebetween, like poles of adjacent permanent magnets adjoining the soft-iron intermediate pieces, and the magnetizing axes of the permanent magnets being arranged in parallel with the direction of movement. The arrangement is such that the magnetic flux, deflected by the soft-iron intermediate pieces perpendicularly to the direction of movement, produces, in both parts, like poles facing each other and repelling each other in unstable equilibrium at the same height in relation to the direction of movement.

5 Claims, 12 Drawing Figures

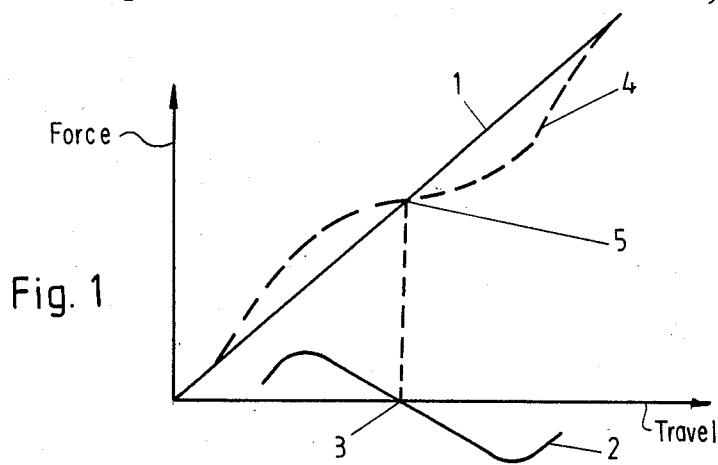
Fig. 1
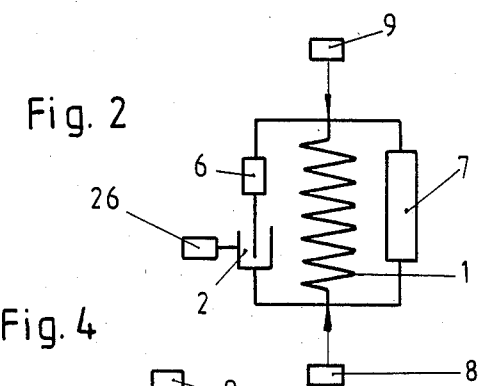
Fig. 2
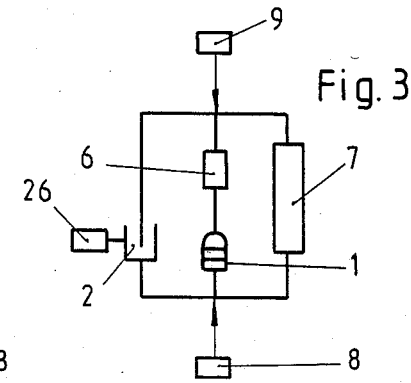
Fig. 3
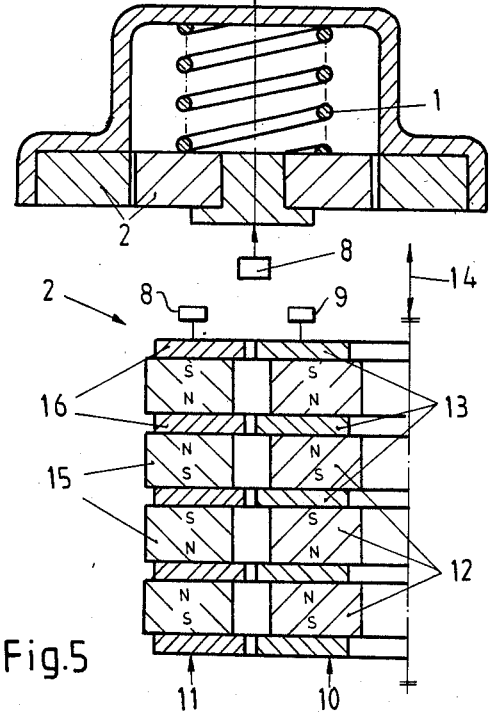
Fig. 4
Fig. 5
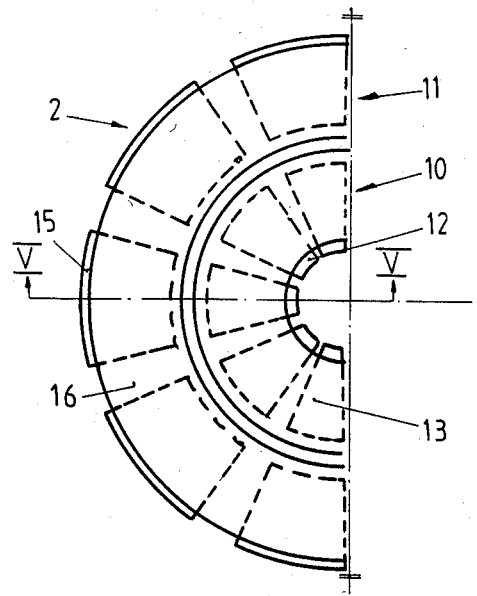
Fig. 6

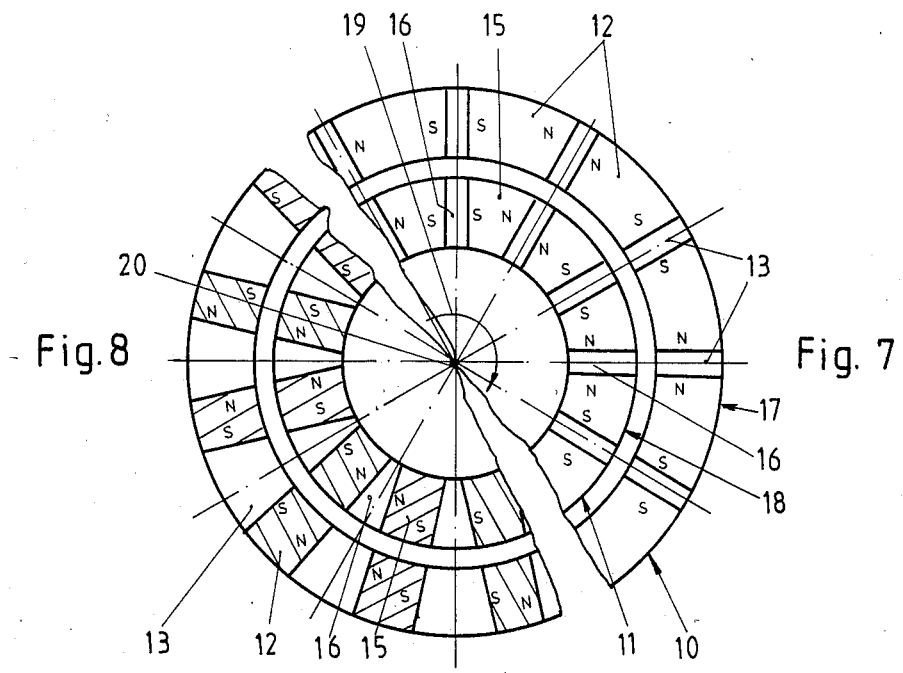
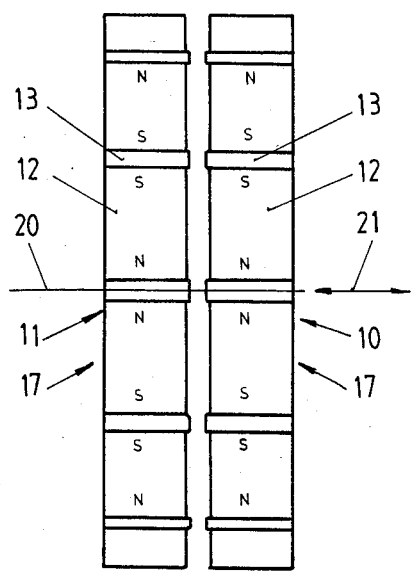
Fig. 9

SPRING-SYSTEM FOR MOTOR VEHICLES

TECHNICAL FIELD

The invention relates to a suspension-system inserted between the unsprung and the sprung masses of a motor-vehicle.

BACKGROUND OF THE INVENTION

A suspension-system of this kind is known from D-D-PS No. 28 186, in which a suspension-spring and a correcting spring arranged in parallel with each other are provided. The suspension-spring possesses positive rigidity, i.e. as the spring is compressed, the force released thereby increases. This increase may be linear or approximately linear, so that the characteristic curve of the suspension-spring in the force-travel diagram is a line ascending more or less linearly towards the right. The suspension-spring is relatively stiff and permits only limited spring-travel. The suspension-spring is usually in the form of a helical spring. The correcting spring of the suspension-system is a magnetic spring and has two parts, one of which is connected to the sprung mass and the other to the unsprung mass of the vehicle, namely the wheels and axles. One part consists of an annular permanent magnet in which the north and south poles provided are separated from each other by gaps in the ring. The other parts consist of a soft-iron armature equipped with projections and indentations. The soft-iron armature itself has no magnetic properties but is magnetized by the magnetic flux of the other part, depending upon its position. When the projections from the soft-iron armature are exactly at the gaps between the north and south poles, as illustrated, this magnetic spring is in unstable equilibrium at its operating point. The projections of the soft-iron armature are attracted by adjacent poles of the permanent magnet with equal but opposite forces. A small shift or rotation of the soft-iron armature results in the unstable equilibrium position being abandoned and an increasing force, acting in the direction of movement, being applied to the projections. The same occurs in the opposite direction of rotation and again the force acting in the direction of movement increases. This force is at its maximum at an angle of rotation of about 22.5°, but declines to zero again when the projections on the soft-iron armature are exactly opposite the poles of the permanent magnet, i.e. after a rotation of about 45°. A stable equilibrium position is then reached, i.e. rotation from this position allows a force to arise on the armature in a direction opposite to the direction of movement. Thus, the desired non-linear characteristic curve of the suspension-system is produced from the suspension-spring and the parallel correcting spring in that the pole-like projections on the soft-iron armature are attracted by the poles, each at an angle of 45° thereto, of a permanent magnet. The forces produced by the attraction between the soft-iron projections and the permanent magnet are limited and are inadequate for many applications. In fact, the desired soft characteristic curve at the operating point of the suspension-system can be obtained only if the negative rigidity at the zero-crossover of the correcting spring is almost of the same magnitude as the positive rigidity of the suspension-spring. The negative rigidity of the correcting spring signifies that, with increasing deflection, its characteristic curve in the force/travel diagram declines, and, at the operating point of the suspension-system, a zero-crossover of the characteristic curve of the correcting spring, within the meaning of an unstable equilibrium, must never be provided. The zero-crossover signifies that the correcting spring releases no force at this operating point. In the case of the magnetic correcting spring in D-D-PS No. 28 186, the achievable rigidity, i.e. the magnitude of the descending slope of the characteristic curve of the correcting spring in the force/travel diagram, is very limited. Another disadvantage is that movement of the springs produces in the soft-iron armature eddy-currents leading to considerable heating and damping which must frequently be regarded as an unwanted side-effect. As a result of the reverse-magnetizing of the soft-iron armature there occurs, during spring movements, a force/travel characteristic which, with high oscillating frequencies such as are typical in motor-vehicle suspensions, has an increasing chronological phase-delay as compared with the stationary case. This may even lead to dynamic instability, which is highly detrimental. The known suspension-system must comprise a device for adjusting the zero-crossover of the correcting spring, since the permanent magnetic poles of the outer part of the ring must be adjustable in relation to the pole-like projections on the soft-iron armature, or vice-versa. More particularly when the motor-vehicle is at rest, the two parts must be adjustable to the gaps, i.e. in unstable equilibrium, depending upon the load on the vehicle.

German OS No. 1 755 496 also discloses a suspension-system consisting of a suspension-spring and a correcting spring in parallel therewith. In this case, the correcting spring is a helical spring which exhibits its maximum compression in unstable equilibrium. In this way a dead-centre position is reached. Superimposition of the characteristic curves of the suspension-spring and the correcting spring produces, for the suspension-system, the desired softness of characteristic at the operating point. Various types of adjusting devices are shown for the purpose of adjusting the dead-centre position of the correcting spring according to the load carried by the vehicle.

It is the purpose of the invention to provide a suspension-system for motor-vehicles which will be light in weight but will provide improved driving comfort as compared with existing suspensions. In addition to this, there is to be a reduction in spring-travel produced by static forces, e.g. changes in the load carried by the vehicle, travelling around curves, accelerating and braking, changes in aerodynamic loading, and the like.

GENERAL DESCRIPTION

According to the invention, this is achieved in that the correcting spring comprises two parts each equipped with permanent magnets, one of the parts being connected to the sprung mass and the other to the unsprung mass. The parts of the correcting spring each comprise a plurality of permanent magnets arranged one behind the other in the direction of movement with pieces of soft-iron arranged therebetween, like poles of adjacent permanent magnets adjoining the soft-iron pieces and the magnetizing axes of the permanent magnets being arranged in parallel with the direction of movement. The arrangement is therefore such that magnetic flux, deflected by the soft-iron pieces perpendicularly to the direction of movement, produces, in both parts, like poles facing each other and repelling each other in unstable equilibrium at the same height in relation to the direction of movement. Equipping the two parts of the correcting spring with permanent magnets substantially improves the concentration of magnetic energy. More particularly, the arrangement permits the use of anisotropic bar-magnets of high energy-density. The soft-iron pieces serve to focus the magnetic flux, deflecting it in a direction perpendicular to the direction of movement. This produces a concentrated repulsion in the direction of the displacement at the operating point of the suspension-system and corresponding to the zero-crossover of the correcting spring. The rigidity achievable at the operating point is considerable. The power/weigh ratio is better by at least an order of magnitude than in the case of the arrangement according to D-D-PS No. 28 186 which operates on a different principle. No reverse-magnetizing takes place because the soft-iron pieces of each part of the correcting spring carry their own impressed magnetic flux.

The suspension-spring is designed to absorb static and quasi-static forces and moments and is provided for that purpose. Dynamic forces are absorbed by the suspension-system consisting of the suspension-spring and the correcting spring. The suspension-spring may be one of several quite different designs, for example mechanical, pneumatic, hydro-pneumatic or also electrical, but it is essential that it have an approximately linear characteristic curve and high positive rigidity. High rigidity produces relative short spring travel, i.e. even when heavily loaded the vehicle pitches comparatively little and there is thus no need for complex head-light adjustment. However, the low rigidity of the suspension-system in and around the zero-crossover of the correcting spring is available at the operating point to absorb dynamic forces and moments, thus improving driving comfort and utilizing the softness of the suspension-system at this point.

If it is possible to use a correcting spring, the spring characteristic of which is spread or drawn apart in parallel with the spring-travel in such a manner that the resulting spring characteristic of the suspension-system covers substantially all loading cases, it may well be unnecessary to provide a device for measuring the operating point of the suspension-system and for adjusting the zero-crossover of the correcting spring in relation to the operating point. It is generally necessary, however, for the zero-crossover of the correcting spring, and the operating point of the suspension-system defined by stationary forces and moments, to be caused to coincide in each equilibrium-position between the sprung and the unsprung masses, either the zero-crossover of the correcting spring being adjusted to the operating point or vice-versa. This follow-up or adjusting device is usually arranged within the suspension-system in series with the correcting spring, but other arrangements are possible. For instance, the device may also be arranged in series with the suspension-spring which may then be designed quite simply as a pneumatic spring. The advantage of this device for measuring the operating point of the suspension-system, and adjusting the zero-crossover of the correcting spring in relation to the operating point, is that substantially the same driving comfort is obtained regardless of the load carried by the vehicle. This means that the suspension-system behaves in about the same way regardless of whether the vehicle is running light or heavily loaded. Obviously it is also possible to use a control-circuit for this adjustment and follow-up, the circuit also containing the device for measuring the operating point. As already indicated, it is also possible to adjust the operating point of the suspension-system to the zero-crossover of the correcting spring, for example if the suspension-spring is in the form of a pneumatic spring with a level-control valve, as in the case of trucks and buses. As the passengers enter and leave the vehicle, the level-control valve also restores the relative position between the sprung body of the vehicle and the unsprung axles, allowing the correcting spring, arranged in parallel therewith, to operate at all times at or about its zero-crossover.

The main advantages of the suspension-system according to the invention are to be perceived in that simplicity of the design, the low weight, and the small dimensions of the parts used. Even if the suspension-spring is in the form of a helical spring, this may be substantially shorter than those hitherto used, making it much easier to install in a passenger car, since it takes up less space. Nor does this impair driving comfort; surprisingly enough it may be substantially improved as compared with existing suspension-systems, since the relative high negative rigidity of the correcting spring reduces the rigidity of the suspension-system, in fact, it is even possible to achieve disappearing rigidity at the operating point of the suspension-system. Since there are no wearing parts, the suspension-system has a long life and requires little repair-work, i.e. the system possesses great mechanical reliability. Since the suspension-spring can be designed more rigidly by a multiple than known telescopic legs without in any way impairing the slight rigidity needed at the operating point for satisfactory suppression of interference, the lower static deflection also provides corresponding advantages as regards the effect of external loads on the vehicle body. The latter therefore possesses extremely favourable stability, i.e. spring travel is fundamentally reduced. This, for example, also reduces the extent to which the body is tilted by the wind when the vehicle is travelling, and this again improves road-holding. Although the vehicle lies "like a plank" on the road, it has a soft feeling at the operating point corresponding to the particular static loading, i.e. driving comfort is improved. The suspension-system according to the invention makes it possible to adjust the operating point quite simply to the zero-crossover, or vice-versa, or to adapt a neutral setting to varying static operating loads. In the latter case, the follow-up forces are always extremely small, about two orders of magnitude less than the static forces involved.

The suspension-system may be designed in various ways, one of which provides a very compact design with linear spring-travel. The permanent magnets are glued to the soft-iron annular discs, so that the discs not only provide the focussing effect, but also hold and guide the permanent magnets.

In accordance with another embodiment of the invention, it is possible to produce a torsion-spring which may be used if the unsprung mass is to rotate about an axis secured to the body of the vehicle. In one case, the two parts are of the same size which simplifies production; in another case, the permanent magnets may be arranged in a straight line, a particularly simple design permitting linear spring-movement. According to another embodiment, the permanent magnets may be trapezoids, sectors, or may be defined by right angles on all sides.

If, the distance between the two parts is altered, this alters the repelling action of the parts of the correcting spring and thus the rigidity thereof. Eventually this also has an effect upon the softness of the suspension-system.

The distance may be altered as a function of speed, in order to ensure constant driving comfort at any driving speed, without impairing the stability of the body of the vehicle provided by the rigid suspension-spring. The same, or a similar, effect can also be obtained with a device to alter the opposing effective surfaces of the poles or the distance between them. This second device always operates at right angles to the device for adjusting the zero-crossover.

Driving comfort can be particularly enhanced by one characteristic while, in another characteristic, the device for adjusting the zero-crossover may take many forms. It is to be understood that a device for measuring and sensing the deflection of the suspension-system, or the suspension-spring alone, is always associated with the device for adjusting the zero-crossover.

BRIEF DESCRIPTION OF THE DRAWING

The invention is described hereinafter in greater detail, in conjunction with the drawings attached hereto, wherein:

FIG. 1 is a force/travel diagram with characteristic curves for different springs;

FIG. 2 is a block-diagram of the suspension-system in a first example of embodiment;

FIG. 3 is a block-diagram of the suspension-system in a second example of embodiment;

FIG. 4 is a diagrammatical cross-section through the suspension-system;

FIG. 5 is a half-section through a first example of embodiment of the correcting spring along the line V—V in FIG. 6;

FIG. 6 is a plan view of the correcting spring according to FIG. 5;

FIG. 7 is a side elevation of a second example of embodiment of the correcting spring in the form of a torsion-spring;

FIG. 8 is a plan view, similar to FIG. 7 in using the same axis of rotation as in FIG. 7, of a third example of embodiment of the correcting spring in the form of a torsion-spring;

FIG. 9 is an end-view of a fourth example of embodiment of the correcting spring in the form of a torsion-spring;

DETAILED DESCRIPTION

Figure 10:
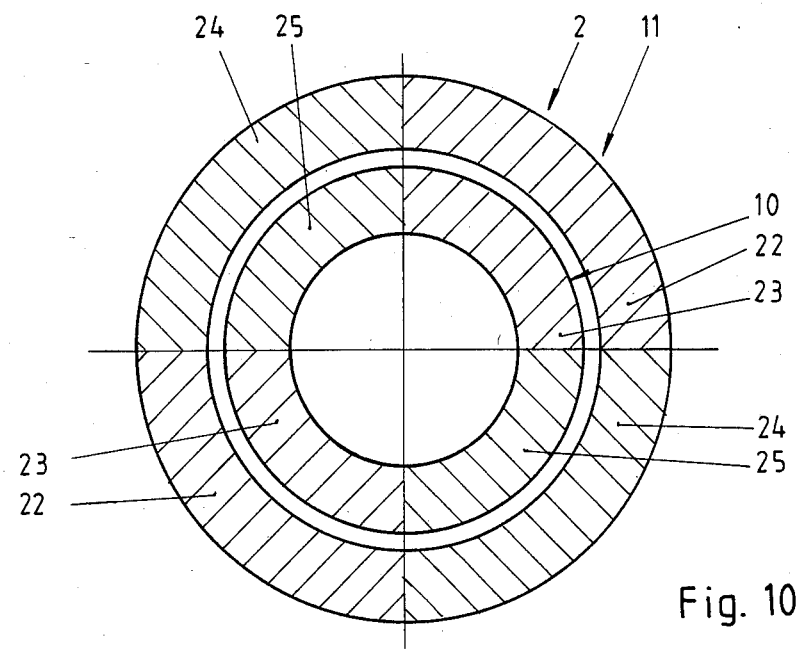
FIG. 10 is a diagrammatical representation of a modified example of embodiment of the correcting spring according to FIGS. 5 and 6 in a first position.

FIG. 1 is a diagram showing force over travel, showing the characteristic curves of suspension-spring 1 and correcting spring 2 in full lines. The characteristic curve of the suspension-spring is positive and linear. It rises relatively steeply, showing that the spring is relatively stiff. The characteristic curve of correcting spring 2 is not linear. It comprises a zero-crossover 3, a point where no force (force=0) is applied by the correcting spring on the parts supported by the suspension-system. In the vicinity of this zero-crossover, negative rigidity is obtained. Adding the characteristic curves produces the broken curve which, in the case of suspension-system 1, 2, arises from the parallel arrangement of suspension-spring 1 and correcting spring 2, i.e. characteristic curve 4 with its operating point 5, a point which is determined and located by zero-crossover 3 of correcting spring 2. It will be seen that, at operating point 5, resulting characteristic curve 4 rises very slightly. In other words, suspension-system 1, 2 has relatively low rigidity at this point, as a result of which suspension here is relatively soft and provides great driving comfort. Beyond the range determined by operating point 5, however, the spring-system again has great rigidity.

FIG. 2 shows a preferred example of embodiment of the suspension. In this case, suspension-spring 1 is in the form of a mechanical spring, i.e. a helical spring, which is comparatively rigid and of relatively short length. Correcting spring 2, arranged in parallel therewith, is a non-linear magnetic spring. A device 6 serves to adjust zero-crossover 3 of the correcting spring in relation to operating point 5 of the suspension-system. A second device 26 is provided. This engages with the correcting spring and serves to alter either the distance between the poles and the soft-iron pieces or the effective surfaces of the poles. This second device always operates at right angles to the operating direction of first device 6. Since, according to the load carried by the vehicle, the suspension-system can assume an infinite number of operating points 5, it is a matter of causing zero-crossover 3 to coincide with the given operating point 5. A conventional shock-absorber 7 is preferably arranged in parallel with the suspension-system 1, 2, but may also be omitted. Suspension-system 1, 2 is inserted between unsprung mass 8, or the respective part of the mass, and sprung mass 9, or the respective part of the mass. Unsprung mass 8 includes the wheels, axles and axle-parts, whereas sprung mass 9 is the body of the vehicle. Device 6 is arranged in series with correcting spring 2 in order to adapt to zero-crossover 3 thereof. The forces required for this are very small, and conventional electric or hydraulic adjusting motors (not shown in the drawings) may easily be used.

FIG. 3 differs from FIG. 2 merely in that device 6 is arranged in series with suspension-spring 1 within the parallel circuit. In this case, suspension-spring 1 is a pneumatic spring, for example, as used on buses and other commercial vehicles. By means of a level-control unit, not shown, the operating point of suspension-spring 1 is adjusted in such a manner that it always assumes the same position relative to the unsprung mass 8 regardless of the load in the vehicle body. This makes it possible to use a fixed correcting spring, with no device for adjusting the operating point. In this case, the level-control unit, which is still needed, is used as device 6 for adjusting operating point 5.

FIG. 4 shows a more constructive design of suspension-system 1, 2 consisting of suspension-spring 1 and correcting spring 2 which is in the form of a magnetic spring. Device 6 is not shown. It is very easy to see, however, the low structural height of the suspension-system, how simple the design may be, and how to obtain a system low in weight.

FIGS. 5 and 6 illustrate the design of correcting spring 2 as a magnetic spring with an axially symmetrical arrangement. The spring has two parts 10 and 11. Part 10 is connected, for example, to sprung mass 9 of a motor vehicle (not shown), while part 11 is connected to unsprung mass 8, or vice-versa. Part 10 consists of a stock of permanent magnets 12 arranged one behind the other in the direction of movement, designed as magnetic segments, and exhibiting the given magnetism. The individual magnets are separated from each other by pieces of soft-iron 13 serving to focus the magnetic field. The permanent magnets and pieces of soft-iron are distributed around the entire periphery. The intermediate pieces of soft-iron may be in the form of continuous rings. The magnetizing axes of permanent magnets 12 are arranged in parallel with direction of movement 14, the poles of the magnets being arranged in such a manner that two consecutive magnets with like poles face each other and adjoin relevant piece 13 of soft-iron.

The same applies to part 11 comprising permanent magnets 15 and soft-iron intermediate pieces 13. FIG. 5 shows quite clearly the correcting spring in its unstable equilibrium condition, i.e. zero-crossover 3 of correcting spring 2 as is illustrated in FIG. 1. Pieces of soft-iron 13 and 16 face each other directly and at the same height in relation to direction of movement 14. The operating point, adjusting itself to the load on the suspension-system, must coincide with this zero-crossover of the correcting spring, and the zero-crossover must therefore be adjusted into operating point 5 of the suspension-system which adjusts itself under load. In the position shown in FIG. 5, the outer edges of inner soft-iron pieces 13 form, jointly with the immediately opposite inner edges of outer soft-iron pieces 16, pairs of like poles, i.e. of repelling polarity. Permanent magnets 12, 15, arranged between intermediate soft-iron pieces 13, 16, are magnetized axially in a simple manner.

The correcting spring illustrated in FIG. 7 is in the form of a torsion-spring. An outer ring 17 consists of permanent magnets 12 and intermediate soft-iron pieces 13. Like poles of adjacent permanent magnets 12 adjoin a piece of soft-iron 13. Similarly, an inner ring 18 consists of permanent magnets 15 and intermediate soft-iron pieces 16. As indicated by arrow 19, rings 17 and 18 can rotate in relation to each other about an axis 20. Either outer ring 17 is stationary and inner ring 18 rotates in relation thereto, or vice-versa. Zero-crossover, corresponding to the unstable equilibrium, is achieved, in the relative position shown, when soft-iron discs 13 and 16 face each other directly. Permanent magnets 12, 15 are in the form of sectors or trapezoids and may extend, together with relevant soft-iron discs 13, 16, respectively over 30° of the periphery. It is obvious that the arrangement is uniform over the entire periphery. Device of FIG. 7 operates in the direction of axis of ratation 20 in that rings 17, 18 are displaced in relation to each other along the axis of ratation 20 so that they overlap only partly.

In the design in FIG. 8 is similar to that in FIG. 7. In this case, however, permanent magnets 12, 15 are in the form of rectangular parallelepipeds, whereas intermediate soft-iron pieces 13, 16 are in the form of sectors.

In the design according to FIG. 9, the correcting spring does not consist of two concentric rings 17, (FIG. 7), but of two identical rings 17 facing each other upon an axis of rotation 20. The advantage of this design is that parts 10 and 11 are identical, thus simplifying production. It is also possible to adjust one ring 17 in relation to the other ring 17 in the direction of axis of rotation 20, i.e. in the direction of arrow 21, by means of second device 26, shown in FIG. 2 thus varying the approximation between the two rings and varying the rigidity of the correcting spring. This adjustment may be carried out as a function of speed while the vehicle is in motion, thus ensuring an equal degree of driving comfort at all speeds without reducing stability. In other words, the suspension-system is made particular soft at low speeds, whereas at high speeds rings 17 are moved towards each other in order to increase the rigidity the correcting spring and thus to harden the characteristic curve of the suspension-system since, at high speeds, dynamic loads act with greater frequency upon the vehicle.

Figure 11:
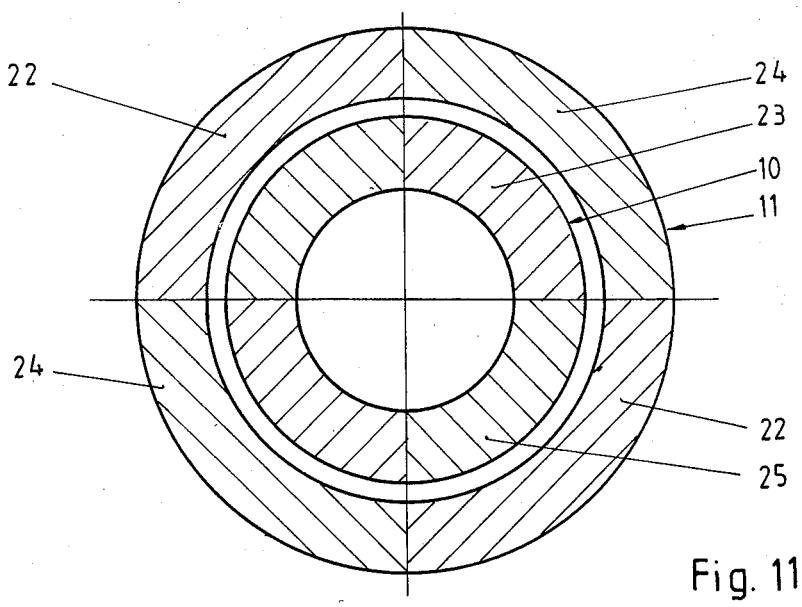
FIG. 11 is a diagrammatical representation of a modified example of embodiment of the correcting spring according to FIGS. 5 and 6 in a second position.

Another way of obtaining a correcting spring 2, having a characteristic curve which can be altered, is illustrated in FIGS. 10 and 11. This diagrammatical design is similar to the example of embodiment according to FIGS. 5 and 6, except that permanent magnets 12, 15, and intermediate soft-iron pieces 13, 16 associated therewith, are not distributed over the entire periphery, but over only two quarters 22, 23 thereof and so that they oppose each other, as shown in FIG. 10. The other two quarters 24, 25 are made of materials which are not magnetically active and not electrically conductive, e.g. plastic, and are therefore not equipped with permanent magnets or intermediate soft-iron pieces. It is to be understood that the arrangement need not necessarily consist of four quarters 22 to 25 in each ring. Instead, the parts of the periphery equipped with permanent magnets and pieces of soft-iron may extend over 60° instead of 90°. Now FIG. 10 shows the relative position in which magnetic correcting spring 2 develops its maximal effect, i.e. exhibits its maximal rigidity. FIG. 11, on the other hand, shows the magnetically fully inactive position in which magnetically active quarters 22 and 23 face the always inactive quarters 24 and 25. In this condition the effect of the correcting spring is eliminated (as at higher vehicle speeds). Thus the characteristic curve of suspension-system 1, 2 appears at operating point 5 corresponding to suspension-spring 1. Obviously intermediate positions between FIGS. 10 and 11 are possible, so that the effect of correcting spring 2 upon the characteristic curve of the suspension-system can be eliminated progressively or stepwise.

Figure 12:
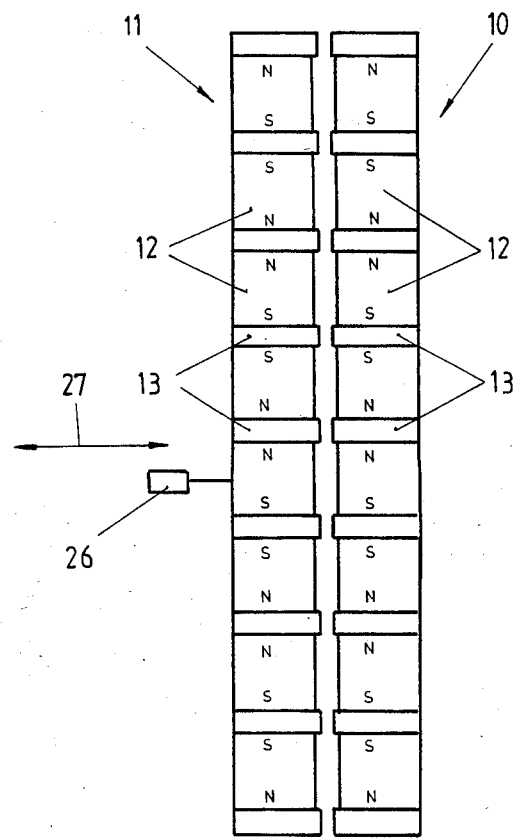
FIG. 12 is a diagrammatical side elevation of a correcting spring for linear movement.

FIG. 12 is a side elevation of another possible design of the correcting spring. In this case, permanent magnets 12 and intermediate soft-iron pieces 13 are in the form of rectangular parallelepipeds and are arranged in columns forming one part 10 of the correcting spring. The other part 11 is built up in the same way with the same dimensions. Part 10 may be stationary, for example, while part 11 may move in relation thereto in direction of movement 14. Thus the movement in this case is linear, as in the example according to FIGS. 5 and 6. The entire length of parts 10 and 11 may be equipped with, or built up from, alternate permanent magnets 12 and intermediate soft-iron pieces 13, parts 10 and 11 being of the same length in direction of movement 14. Device 26 for adjusting zero-crossover is operated in direction of movement 14. Device 26 may be made to act in two different directions. On the one hand, this device makes it possible to vary the distance between parts 10 and 11 in the direction of arrow 27, thus varying the rigidity of the correcting spring. On the other hand, the device may be allowed to act upon part 11 at right angles to the plane of the drawing, in constant, but the pole overlap is altered, in other words the effective surfaces of the poles is altered.

The embodiments of the invention in which an exclusive property or privilege is claimed are defined as follows:

1. A suspension system adapted to be used with a motor vehicle for insertion between the sprung and unsprung masses of the motor vehicle comprising, in combination, suspension spring means with relatively high positive rigidity; a magnetic correcting spring arranged in parallel with said suspension spring in unstable equilibrium and having negative rigidity at zero-crossover of its force-travel characteristic; means for determining the operating point of the suspension system in relation to the normal height of the vehicle above a road due to stationary loads; and means for adjusting zero-crossover of said magnetic correcting spring relation to a determined operating point; and with said correcting spring comprising two stacks of permanent magnets, one of said stacks being connectable to the sprung mass and the other including connectable to the unsprung mass, and with each stack including a plurality of adjacent permanent magnets stacked one behind the other in a direction of relative movement between the sprung and unsprung masses and with intermediate pieces of soft iron disposed between said adjacent permanent magnets and with like poles of said adjacent permanent magnets adjoining said soft iron intermediate pieces, and the magnetizing axes of said permanent magnets oriented in parallel with said direction of relative meovement.

2. A suspension system according to claim 1 wherein said zero-crossover adjusting means comprises adjusting motor means coupled with one of said stacks.

3. A suspension system according to claim 1 characterized in that said permanent magnets and said intermediate pieces are connected together alternately into two concentric rings, and in that the axis of said rings forms an axis of rotation.

4. A suspension system according to claim 1 characterized in that said permanent magnets and said soft-iron intermediate pieces of said two stacks form two coaxial rings.

5. A suspension-system according to claim 1 further comprising means for varying the distance between said two stacks

* * * * *